United States Patent [19]

Cornwell et al.

[11] 4,321,243
[45] Mar. 23, 1982

[54] METHOD OF PRODUCING STABILIZED AQUEOUS DISPERSIONS OF SILICA FUME

[76] Inventors: Charles E. Cornwell, 7104 Marlan Dr., Alexandria, Va. 22307; Mark Plunguian, 1515 S. Jeff. Davis Hwy., Arlington, Va. 22202

[21] Appl. No.: 175,668

[22] Filed: Aug. 5, 1980

[51] Int. Cl.³ .......................................... C01B 33/141
[52] U.S. Cl. ................................ 423/268; 252/313 S; 423/267; 423/337; 423/335
[58] Field of Search ................ 252/313 S; 423/335, 423/337, 268, 267

[56] References Cited

U.S. PATENT DOCUMENTS 3,455,717  7/1969  Debus .............................. 252/313 S

FOREIGN PATENT DOCUMENTS 758556  4/1971  Belgium ............................ 423/335
521741  2/1956  Canada ........................... 252/313 S
646283  8/1962  Canada ............................ 423/337

OTHER PUBLICATIONS

Moore et al. "Chem. Abstracts", vol. 83, 1975, 30430W.

*Primary Examiner*—Jack Cooper

[57] ABSTRACT

Silica fume, the by-product from the manufacture of silicon and ferrosilicon alloys, is dispersed in water and the aqueous dispersion is stabilized to retain its fluidity and redispersibility by treatment with an acid or with a chelating agent.

2 Claims, No Drawings

METHOD OF PRODUCING STABILIZED AQUEOUS DISPERSIONS OF SILICA FUME

BACKGROUND OF THE INVENTION

The present invention relates to the production of stabilized aqueous dispersions of silica fume, suitable for greater economy and ease in transportation and greater possibility of utilization in industry.

During the commercial production of silicon and ferrosilicon alloys, the main by-product is the so-called silica fume. This consists of over 90% silicon dioxide of very chemically active and extremely fine particle size. Previously this was allowed to escape into the atmosphere. With the more recent requirements for pollution abatement the silica fume is now collected and disposed of. Up to 500 tons per week of silica fume is thus collected at one plant and carted off to a land fill.

The powdered silica fume is very difficult to handle, transport and use, mainly because of its very bulky, fluffy nature. Thus, for example, closed, air-tight trucks are required to transport this material. We have now developed a method of producing highly concentrated aqueous dispersions of silica fume, so that its transportation and ultimate utilization may be achieved at less cost.

The process of producing metallic silicon consists of feeding a charge of quartz, coal, and wood chips to the top of a tall furnace provided with carbon electrodes. At the high temperature at the bottom of the furnace, the silicon dioxide is reduced by the carbon to silicon, which melts, and is tapped periodically. To produce the ferrosilicon alloys, scrap iron is also added to the charge.

The gaseous by-products are carbon monoxide which oxidizes to carbon dioxide, and silicon suboxide which oxidizes to silicon dioxide, when the gases reach the top of the furnace. The particulates are the so-called silica fume.

Typical analyses and properties of the submicron silica fume are:
SiO: 96.09%
$Fe_2O_3$: 0.34%
MnO: 0.09%
$Al_2O_3$: 0.21%
CaO: 0.35%
MgO: 0.23%
$K_2O$: 0.59%
$Na_2O$: 0.07%
$SO_3$: 0.35%
loss in ignition: 1.68%
Surface area: 25.9 $m^2$/gram
Particle size: 0.25–0.02 microns
Average particle size: 0.12 microns
Bulk density as generated: 4–6 pcf
Bulk density (packed): 12–14 pcf
pH: 6.7

DESCRIPTION OF THE INVENTION

We first attempted to disperse the silica fume in water. Thus, a 50% dispersion in water was quite fluid. However, on standing in a closed container over night, the dispersion became very stiff. After another day, it became a hard mass. Even at 30% silica fume with 70% water, the dispersion also became hard in two days.

It was then found that acidification stabilized the dispersions in their fluid state. At about 50% concentration it remained fluid indefinitely. At still higher concentrations of about 70% and 75% solids the dispersions were thixotropic and could be readily redispersed by mixing. Just before use in a chemical process where the low pH would be objectionable, it could readily be neutralized, such as with lime. Another means of stabilizing the dispersions was found to be possible by the use of chelating agents, i.e., ethylene diamine tetraacetic acid and its soluble salts.

The process is more fully described in the following examples:

EXAMPLE 1

100 grams silica fume was dispersed in 100 grams water containing 3 grams glacial acetic acid. This dispersion at pH 5.8 remained fluid indefinitely.

EXAMPLE 2

100 grams silica fume was dispersed in 43 grams water containing 3 grams glacial acetic acid. This 70% dispersion was thixotropic. It readily can be fluidized with mixing. The density was 94 pcf.

EXAMPLE 3

100 grams silica fume was dispersed in 43 grams water containing 0.5 grams concentrated hydrochloric acid. This gave a thixotropic dispersion at pH 4.4.

EXAMPLE 4

100 grams silica fume was dispersed in 43 grams water containing 0.5 grams concentrated sulfuric acid. The resulting dispersion was thixotropic and had a pH of 4.0.

EXAMPLE 5

100 grams silica fume was dispersed in 34 grams water containing 0.5 grams concentrated sulfuric acid. This 75% dispersion remained thixotropic for about three days and then became hard.

EXAMPLE 6

Example 5 was repeated with the use of 1.0 grams concentrated sulfuric acid in 34 grams water. This 75% dispersion had a density of 102 pcf and remained thixotropic.

EXAMPLE 7

Silica fume was dispersed in 34 grams water containing 0.5 grams ethylene diamine tetraacetic acid to give a 75% solids thixotropic dispersion at pH 6.6.

EXAMPLE 8

100 grams silica fume was dispersed in 34 grams water containing 0.5 grams of the tetrasodium salt of ethylene diamine tetraacetic acid. This 75% dispersion at pH 7.0 became stiff on standing but could be readily redispersed.

Having thus demonstrated that it is possible to increase greatly the concentration density of the aqueous silica fume dispersions by certain preferred modes of performing our invention, we do not thereby desire or intend to limit ourselves solely thereto; furthermore, the proportions of the materials utilized may be varied and equivalents may be employed, if desired, without departing from the spirit and scope of the invention as defined in the appended claims.

We claim:

1. The method of stabilizing an aqueous dispersion of silica fume at a starting pH of about 6.7, in order to retain its flowability and redispersibility, the fume being the oxidized particulates of the gaseous by-products obtained during the manufacture of silicon and its alloys by feeding a charge of quartz, being composed of silicon dioxide, coal, wood chips, and as an alternate additive also scrap iron to produce ferrosilicon alloys, to the top of a tall furnace provided with carbon electrodes to generate the required high temperature, where the silicon dioxide of the quartz is reduced by the carbon of the coal to silicon and the silicon monoxide in the gaseous by-products is oxidized to silicon dioxide, comprising the step of adding an acid to the aqueous dispersion of the particulates to reduce the pH to a range of 3–6.

2. The method of stabilizing an aqueous dispersion of silica fume at a starting pH of about 6.7, in order to retain its flowability and redispersibility, the fume being the oxidized particulates of the gaseous by-products obtained during the manufacture of silicon and its alloys by feeding a charge of quartz, being composed of silicon dioxide, coal, wood chips, and as an alternate additive also scrap iron to produce ferrosilicon alloys, to the top of a tall furnace provided with carbon electrodes to generate the required high temperature, where the silicon dioxide of the quartz is reduced by the carbon of the coal to silicon and the silicon monoxide in the gaseous by-products is oxidized to silicon dioxide, comprising the step of adding a chelating agent to the aqueous dispersion selected from the group of ethylene diamine tetraacetic acid and its water-soluble salts.

* * * * *